US009878830B2

(12) United States Patent
David

(10) Patent No.: US 9,878,830 B2
(45) Date of Patent: Jan. 30, 2018

(54) FLANGED SEALING MEANS

(76) Inventor: Albert John David, Minchinbury (AU)

(*) Notice: Subject to any disclaimer, the term of this patent is extended or adjusted under 35 U.S.C. 154(b) by 0 days.

(21) Appl. No.: 13/512,013

(22) PCT Filed: Nov. 26, 2010

(86) PCT No.: PCT/AU2010/001592
§ 371 (c)(1),
(2), (4) Date: May 24, 2012

(87) PCT Pub. No.: WO2011/063466
PCT Pub. Date: Jun. 3, 2011

(65) Prior Publication Data
US 2012/0261419 A1 Oct. 18, 2012

Related U.S. Application Data

(60) Provisional application No. 61/383,625, filed on Sep. 16, 2010.

(30) Foreign Application Priority Data

Nov. 26, 2009 (AU) .............................. 2009905779
Jun. 22, 2010 (AU) .............................. 2010902747

(51) Int. Cl.
B65D 17/44 (2006.01)
B65D 41/22 (2006.01)
A47J 47/02 (2006.01)
B65D 45/32 (2006.01)

(52) U.S. Cl.
CPC .............. *B65D 41/22* (2013.01); *A47J 47/02* (2013.01); *B65D 45/32* (2013.01)

(58) Field of Classification Search
CPC ........... B65D 41/22; B65D 45/32; A47J 47/02
USPC .... 220/305, 287, 784, 799, 724, 780, 256.1, 220/377, 578; 215/319, 224, 317, 287, 215/305, 231; 150/165, 164; 206/820
See application file for complete search history.

(56) References Cited

U.S. PATENT DOCUMENTS

| 2,004,449 | A |   | 6/1935  | Stanley    |         |
|-----------|---|---|---------|------------|---------|
| 2,064,411 | A | * | 12/1936 | Brandstein | 215/321 |
| 2,080,108 | A |   | 5/1937  | Brandstein |         |
| 2,628,739 | A | * | 2/1953  | Vischer, Jr. | 220/305 |
| 3,434,614 | A |   | 3/1969  | Moller     |         |
| 3,578,051 | A | * | 5/1971  | Hammon     | 220/799 |

(Continued)

FOREIGN PATENT DOCUMENTS

| EP | 1631132 A1 | 5/2005 |
| EP | 1642841 A2 | 4/2006 |

(Continued)

OTHER PUBLICATIONS

U.S. Appl. No. 12/699,800, filed Feb. 3, 2010 by Tomoya Kawakami Now at the Board of Appeals.

(Continued)

*Primary Examiner* — Anthony Stashick
*Assistant Examiner* — James M Van Buskirk
(74) *Attorney, Agent, or Firm* — Dinsmore & Shohl LLP

(57) ABSTRACT

A structure for substantially sealing a storage unit, wherein the structure includes an elastically stretchable flange cooperable with a lip provided on a rim of the storage unit, wherein the flange is elastically urged to seal against the lip of the storage unit.

12 Claims, 10 Drawing Sheets

(56) References Cited

U.S. PATENT DOCUMENTS

| | | | |
|---|---|---|---|
| 3,862,614 A | | 1/1975 | Kovac |
| 3,901,405 A | * | 8/1975 | Norberg .................. 220/287 |
| 4,901,881 A | * | 2/1990 | McElroy .................. 220/287 |
| 5,036,994 A | | 8/1991 | McElroy |
| 5,271,517 A | * | 12/1993 | Bowers ............. B65D 43/0256 |
| | | | 220/276 |
| 5,409,126 A | * | 4/1995 | DeMars ............. B65D 21/0219 |
| | | | 206/499 |
| 5,964,368 A | | 10/1999 | Schramm |
| 6,260,729 B1 | * | 7/2001 | Mitchell et al. ............. 220/287 |
| 7,299,941 B2 | | 11/2007 | McMahon, III et al. |
| 7,594,586 B2 | * | 9/2009 | Cai .................. B65D 81/2038 |
| | | | 220/231 |
| 7,669,519 B2 | * | 3/2010 | Pope et al. .................. 99/315 |
| 2004/0011107 A1 | | 1/2004 | Boegli |
| 2008/0073366 A1 | * | 3/2008 | Backaert ............. B65D 79/005 |
| | | | 220/785 |

FOREIGN PATENT DOCUMENTS

| | | |
|---|---|---|
| GB | 249738 A | 4/1926 |
| WO | WO 02/30661 A1 | 4/2002 |
| WO | WO 2005/021396 A1 | 3/2005 |

OTHER PUBLICATIONS

Extended European Search Report dated Mar. 11, 2013 for European Application No. 10832428.6.

* cited by examiner

FLANGED SEALING MEANS

This application is the National Stage under 35 USC § 371 of International Application Number PCT/AU2010/001529 filed on Nov. 26, 2010, which claims priority under 35 USC § 119(a)-(d) of Application Number 2009905779 filed in Australia on Nov. 26, 2009 and Application Number 2010902747 filed in Australia on Jun. 22, 2010, and under 35 USC § 119(e) of Provisional Application No. 61/383,625 filed in the United States on Sep. 16, 2010.

TECHNICAL FIELD

The present invention relates to a structure for a storage unit.

BACKGROUND

It is common that open faced storage units, such as containers, vessels, and trays are used to store food or other products, wherein a cover such as a lid or plate is used to close the storage unit. The cover may be used for the purposes of simply ensuring that the products are securely retained within the storage unit, however in other instances the cover is used to create an air tight seal to help ensure freshness or prevent the product contained within being exposed to an external environment.

It is a common problem that storage units are bought without an appropriate cover or people have difficulty locating the correct lid which corresponds to a particular storage unit.

In instances where a corresponding cover cannot be located, thin plastic film or aluminium sheet is used to enclose the storage unit, however this has disadvantages such as failing to create a sufficient air-tight seal, non-reusable, low strength, and not environmentally friendly.

Another problem commonly encountered is that some lids of storage units are quite brittle due to the material which they are manufactured from. For example, lids typically used in combination with trays and pans used in restaurants and the like are typically quite brittle and may fracture during normal use or washing.

Another problem commonly encountered relates to the design of the flange of the lid which cooperates with the lip of the container to retain the lid to the container. If the lid needs to be cleaned, for example a portion of a food product is retained within the flange, it can be extremely difficult to clean this portion of the lid due to the relatively enclosed design of the flange. Cleaning mechanisms, such as dishwashers, are typically not suitable for cleaning the inner surface of flanges of a lid due to their substantially concealed design.

Therefore, there is a need for a structure that overcomes or at least alleviates one or more of the above-mentioned problems, or at least provides a commercial alternative.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

SUMMARY

In one broad aspect there is provided a structure for substantially sealing a storage unit, wherein the structure includes an elastically stretchable flange cooperable with a lip provided on a rim of the storage unit, wherein the flange is elastically urged to seal against the lip of the storage unit.

In one form, the structure is a lid, wherein the lid includes an elastically stretchable membrane having a perimeter including the elastically stretchable flange, wherein the elastically stretchable membrane encloses an open face of the storage unit.

In another form, the flange is movable between a first position, wherein the flange is cooperable to engage the lip of the storage unit, and a second position, wherein at least some of the flange is out-turned such that an inner surface of the flange which engages against the lip of the storage unit faces outwardly.

In one embodiment, the perimeter includes one or more corners, wherein at least some of the corners are twistable to move the flange between the first position and the second position.

In another embodiment, a portion of the flange located at each corner is an overcentered arrangement to retain the corners in one of the first and second position.

In an optional form, the structure includes:
  a first flange portion, extending from the membrane, which extends substantially orthogonal relative to a plane of the membrane; and
  a second flange portion, extending from the first flange portion, which extends substantially parallel and inwardly relative to the plane of the membrane;
  wherein a portion of the membrane adjacent the flange, the first flange portions and the second flange portions cooperate to engage about the lip of the storage unit.

In another optional form, the first and second flange portions have a cross-section thickness greater than a cross-section thickness of the membrane.

In an optional embodiment, the second flange portion extends inwardly from the first flange portion a greater distance at corners of the perimeter compared to the second flange portions at non-corner portions of the perimeter.

In another optional embodiment, the membrane is at least partially transparent.

Optionally, the membrane includes a non-linear cross-sectional profile.

In one form, a portion of the membrane includes an undulated profile in cross-section to allow for the lid to be stretched.

In another form, a portion of the membrane includes a concertinaed arrangement to allow for the lid to be stretched.

In one embodiment, at least a portion of the membrane includes a plurality of pyramidic protrusions.

In another embodiment, the external edge of the flange includes a protruding member to assist in applying leverage to the lid when applying or removing the lid to a storage unit.

In an optional embodiment, the membrane is depressible whilst a substantial portion of the flange is engaged about the lip of the storage unit, wherein excess air contained in the storage unit is expelled via a lifted portion of the flange when the membrane is depressed.

In another optional embodiment, the structure is a band for urging a covering plate to substantially seal against the lip provided on the rim of the storage unit
  Optionally, the band includes:
    a first flange portion which is elastically urged against a top surface of the covering plate resting against the lip of the storage unit such that a substantial seal is formed between the covering plate and the lip of the storage unit;

a second flange portion, extending from and substantially orthogonal to the first flange portion; and a third flange portion, extending from the second flange portion, which extends substantially parallel relative to the first flange portion, wherein the third flange portion is elastically urged to seal against an underside of the lip of the storage unit.

In one form, the first flange portion, the second flange portion, and the flange portion have cross-sectional thickness which is substantially equal.

In another form, the third flange portion located at corners of band protrude inwardly from the second flange portion relative to the third flange portion located at non-corner portions of the band.

In one embodiment, the flange includes a plurality of protrusions to allow for the flange to move between an expanded and retracted position.

In another embodiment, the plurality of protrusions provided on the flange are pyramidic protrusions.

In an optional form, the structure is made from silicone rubber.

Other embodiments will be described throughout the description of the example embodiments.

BRIEF DESCRIPTION OF THE FIGURES

Example embodiments should become apparent from the following description, which is given by way of example only, of at least one preferred but non-limiting embodiment, described in connection with the accompanying figures.

DESCRIPTION OF EMBODIMENTS

Figure 1:
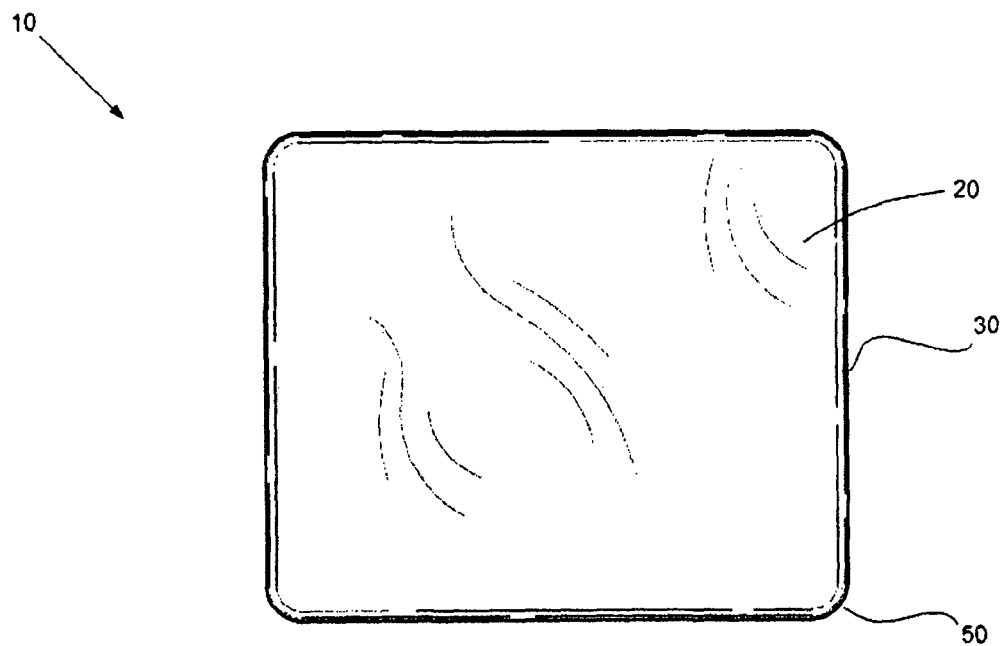
FIG. 1 illustrates a plan view of an example of a lid.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Referring to the figures there is illustrated a structure for substantially sealing a storage unit. The structure includes an elastically stretchable flange cooperable with a lip provided on a rim of the storage unit, wherein the flange is elastically urged to seal against the lip of the storage unit to substantially seal the storage unit.

In one form, the structure may be provided in the form of a lid 10 as shown by FIGS. 1 to 9. In particular, the lid 10 includes an elastically stretchable membrane 20 having a perimeter 30 including an elastically stretchable flange 40 cooperable to engage a lip 210 provided on a rim 220 of a storage unit 200 (see FIGS. 5 and 7), wherein the elastically stretchable membrane 20 encloses an open face of the storage unit.

Figure 4:
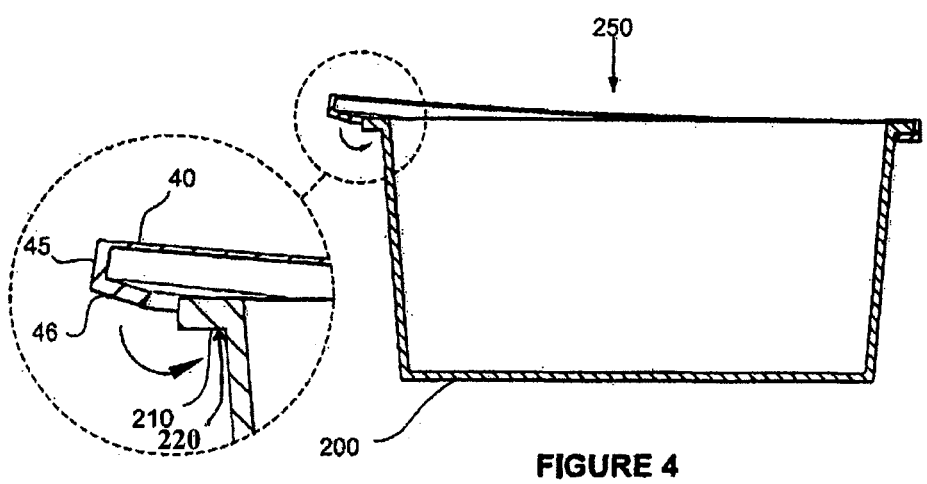
FIG. 4 illustrates a cross-sectional and magnified view of the lid, of FIG. 1 along line A-A being applied to a lip of a storage unit.
Figure 5:
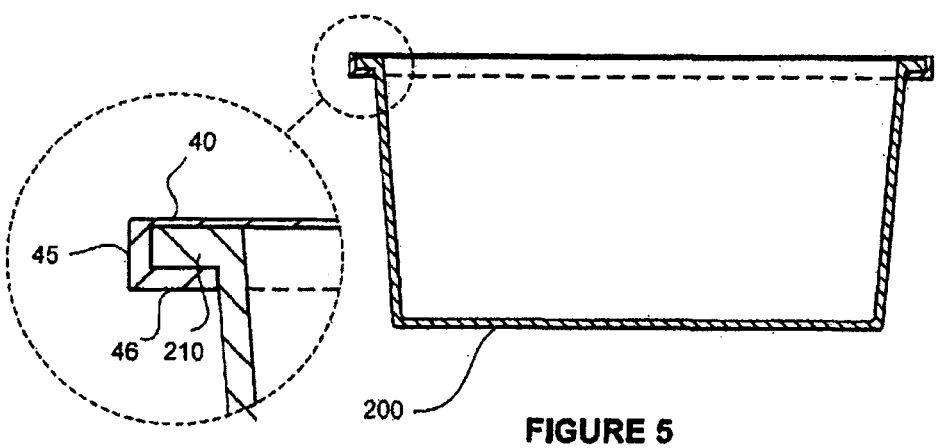
FIG. 5 illustrates a cross-sectional and magnified view of the lid of FIG. 1 along line A-A engaged with the lip of the storage unit.
Figure 7:
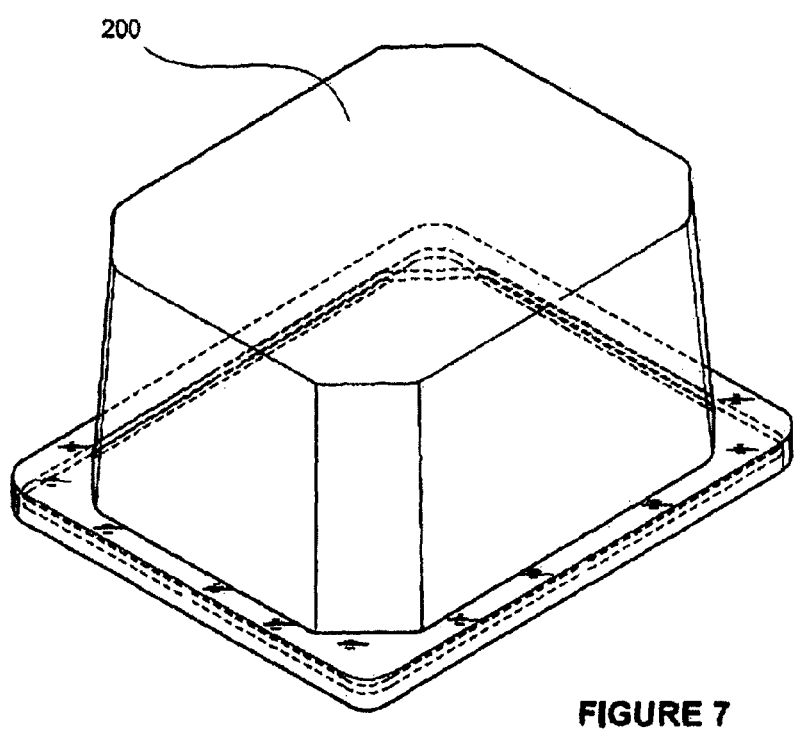
FIG. 7 illustrates a perspective underside view of the lid engaged with the storage unit of FIG. 5.

In use, as shown in FIGS. 4, 5 and 7, the flange 40 is folded over at least a portion of the lip 210 of the storage unit 200, wherein the lid 10 has not completely sealed the storage unit 200. Once at least a portion of the lip 210 of the storage unit 200 has been engaged by a portion of the flange 40, the user can depress the central portion of the membrane, as shown by arrow 250 in FIG. 4, to expel at least a portion of the air contained in the storage unit 200 due to the membrane 40 being elastically deformable and stretchable. This action thereby creates a negative pressure within the storage unit 200. The remaining portion of the flange 40 is then folded over the lip 210 of the storage unit 200 whilst the user substantially maintains a depressed force 250 against the membrane 40. Once the flange 40 has engaged the lip 210 of the storage unit 200, the user can then remove the depressed force 250 being applied to the membrane 40, thereby creating a vacuum between the flange 40 and membrane 20 with the rim 220 and lip 210 of the storage unit 200. However, in an alternate method of attaching the lid to the storage unit, the user may manipulate the lid such that the flange is engaged with the rim of the storage unit. The user may then lift a portion of the flange which is not adjacent the corners and apply a depressed force against the membrane to expel a portion of the air contained within the storage unit. The lifted portion of the flange is then quickly released to thereby create the negative pressure within the storage unit. Due to the negative pressure created by expelling at least some of the air from within the storage unit 200, the membrane 20 may have a depressed profile due to the elastically stretchable property of the membrane 20. This negative pressure helps to effectively seal the membrane 20 and flange 40 with the rim 220 and lip 210 of the storage unit 200. The removal of excess air can assist in the storage of particular products, such as foodstuff and the like, in the storage unit 200 thereby effectively increasing their effective lifespan.

Figure 2:
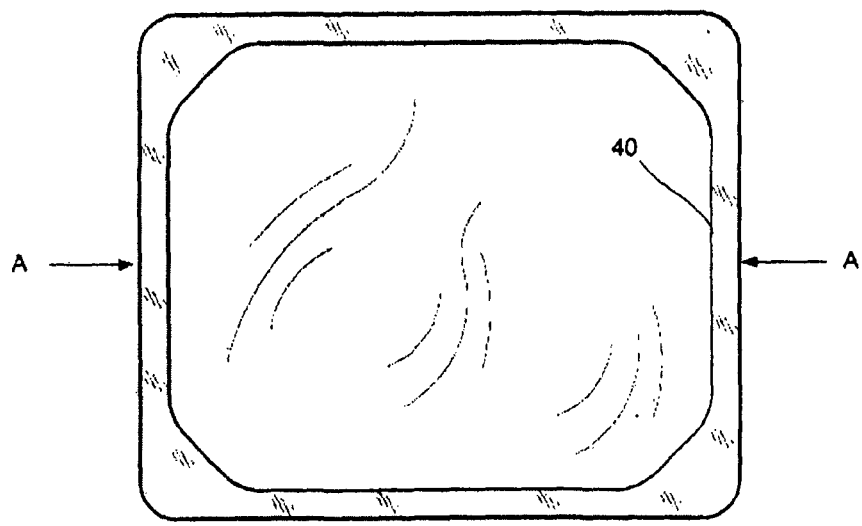
FIG. 2 illustrates an underside view of the lid of FIG. 1.
Figure 6:
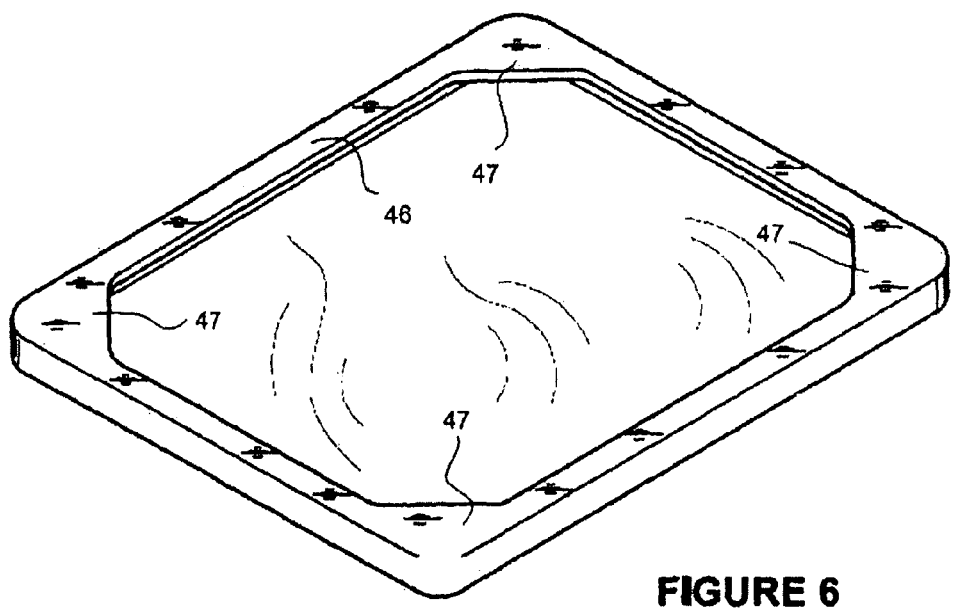
FIG. 6 illustrates a perspective underside view of the lid of FIG. 1.
Figure 9:
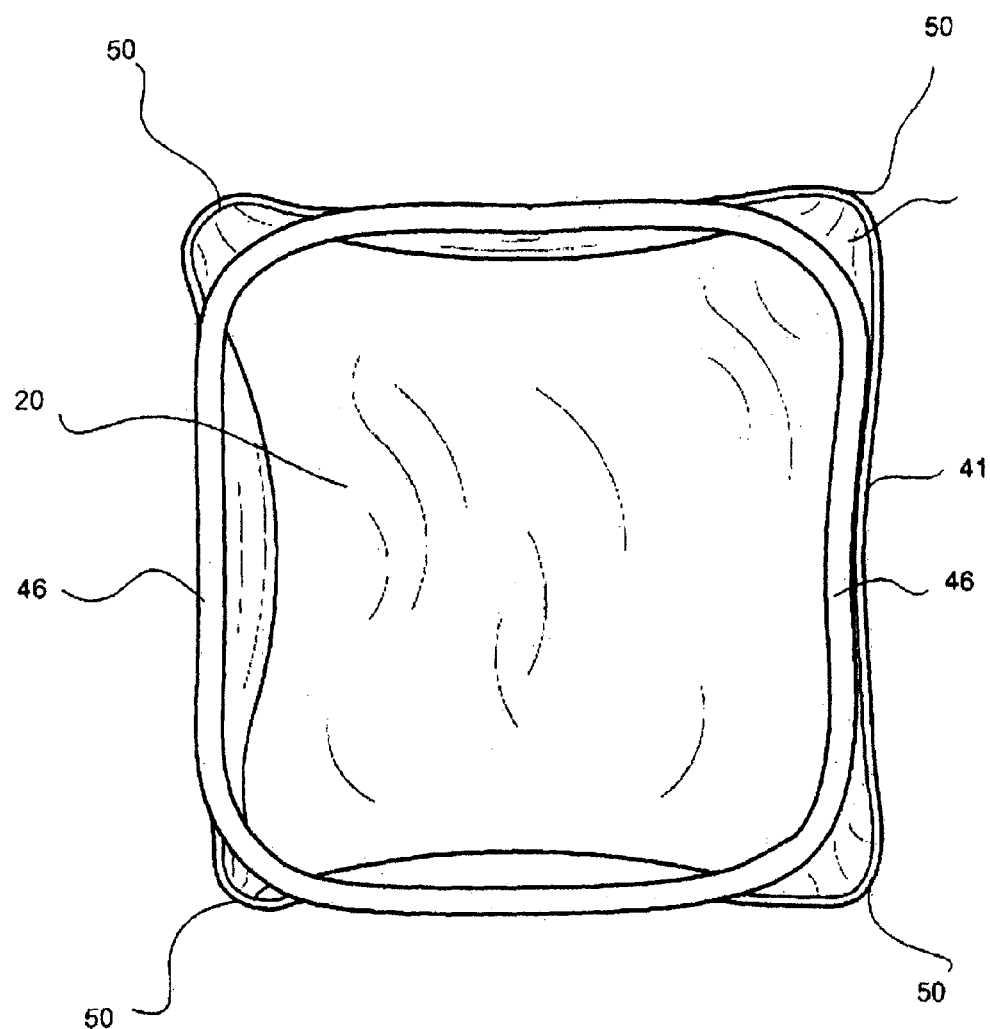
FIG. 9 illustrates the lid of FIG. 1 wherein the flange has been moved to the second position such that the inner wall of the flange is out-turned.

The flange 40 is movable between a first position, as shown in FIG. 6, wherein the flange 40 is cooperable to engage the lip 210 of the storage unit 200, and a second position, as shown in FIG. 9, wherein the flange 40 is out-turned such that an inner surface 41 of the flange 40 which engages against the lip of the storage unit protrudes outwardly. As shown in the figures, the flange 40 is effectively reversed and has been turned inside-out By being able to move the lid to the second position, the inner surface 41 of the flange 40 can be configured to be outwardly facing, thus allowing for the inner surface 41 of the flange 40 to be assessed and cleaned easily, such as via use of a dishwasher and other known cleaning methods and mechanisms which have been difficult to use in the past to clean the flange of a lid. As shown in FIGS. 1, 2 and 6, the perimeter 30 includes one or more corners 50, wherein at least some of the corners 50 are twistable to move the flange 40 between the first position and the second position. Generally, a user can apply a substantially radially directed inward force to an apex of one or more of the corners 50 whilst applying a substantially radially directed outward force to the edge of the flange 40, thereby creating a twisting motion of the flange 40, thereby turning the flange inside-out as shown in FIG. 9.

Figure 3:
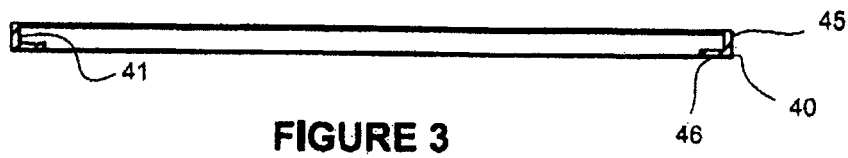
FIG. 3 illustrates a cross-sectional view of the lid along line A-A.

As shown in FIG. 3, the flange 40 can include a number of portions. In particular, the flange 40 includes a first flange portion 45, extending from the membrane 20, which extends substantially orthogonal relative to a plane of the membrane 20 in an unstretched state. The flange 40 also includes a second flange portion 46, extending from the first flange portion 45, which extends substantially parallel and inwardly relative to the plane of the membrane 20 in an unstretched state. A portion of the membrane 20 adjacent the flange 40 in addition to the first flange portions 45 and the second flange portions 46 cooperate together to engage about the lip 210 and rim 220 of the storage unit 200. This configuration thereby provides a three point sealing configuration. Specifically, the under-surface of the adjacent portion of the elastically stretchable membrane 20 seals against the 220 rim of the storage unit 200, the inner surface 41 of the first flange portion 45 seals against the edge of the lip of the storage unit 200, and the upwardly facing inner surface 41 of the second flange portion 46 seals against the under-side surface of the lip 210 of the storage unit 200. Due to the elastically stretchable property of the flange 40 and membrane 20, the flange portions 45, 56 and membrane 20 are biased against the rim 220 and lip 210 of the storage unit 200, thereby providing an effective seal for the storage unit 200 from the external environment.

As shown in FIGS. 6 and 7, a section of the second flange portion 46 extends inwardly from the first flange portion a greater distance at the corners 50 to define a corner flange 47. The corner flanges 47 have a larger second flange portion compared to the flange provided along the non-corner portions of the perimeter 30. This corner flanges 47 allow for the additional engagement between the lid 10 and the storage unit 200. Additionally, the corner flanges 47 enable the flange 40 to resist the bias of the elastic material of the lid from the second position to the first position. As will be appreciated, the corner flanges 47 operate as an overcentre arrangement, wherein when the corners are out-turned, the larger second flange portions 46 retain the lid in the second position as shown in FIG. 9.

Figure 8:
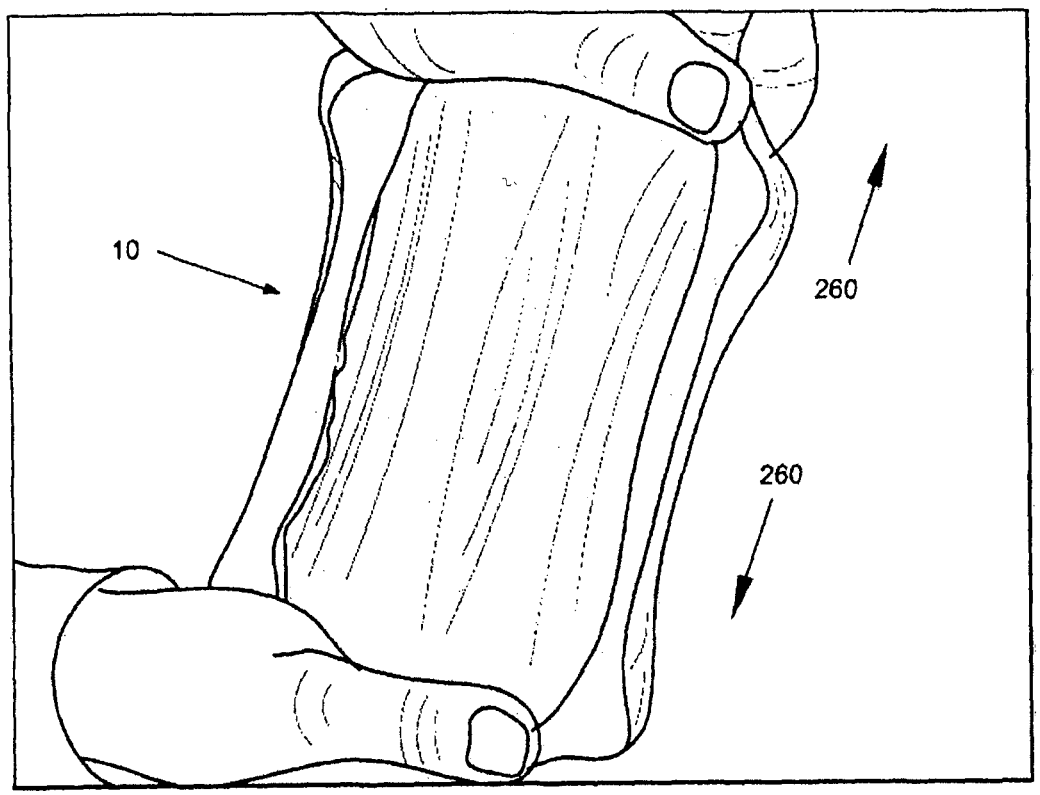
FIG. 8 illustrates a stretching force being applied to the lid of FIG. 1.

As shown in FIG. 8, due to the elastically stretchable property of the membrane 20 and flange 40, the lid can be adapted to be used on variously sized open faces of various storage units 200, particularly where the open face of the storage unit has one or more edges which are longer than one or more edges of the lid 10 which can be stretched to engage about the rim 220 of the storage unit 200 accordingly. A stretching force 260 can be applied to the perimeter of the lid to cause elastic deformation. Preferably, the lid 10 is made from a elastically stretchable material such as silicone rubber, wherein the material is biased back to an unstretched position due to the elastically stretchable property of the material. In an optional form, the lid may be substantially transparent to allow a user to see within the sealed storage unit without having to remove the lid. It will be appreciated that silicone rubber also provides additional advantages such as being heat tolerant. Additionally, silicone rubber can act as a suitable heat-insulating material which can be useful for storing particular products, such as food, where the temperature of the product is to be substantially maintained as long as possible. However, other types of elastically stretchable material could be used accordingly. The lid can be manufactured via a mould, wherein liquid silicone can be poured into the mould which is left to set. The set liquid silicone can then be peeled out of the mould.

In one form, the membrane 20 may have a thickness of approximately 1 mm to 2 mm, however it will be appreciated that the thickness of the membrane 20 may vary according to the particular application. It will be appreciated that the lid 10 disclosed can be used on storage units 200 having a lip that has a thickness between 5 to 35 mm, however it will be appreciated that other thicknesses of storage unit lips 210 may be accommodated. It will be appreciated that the lid may be able to seal various storage units made from various products, wherein the lip and/or rim of the storage unit 200 may be made from steel, plastic, rubber, porcelain, ceramic, acrylic, metal, resin, wood, stone, glass as well as other suitable materials appreciated by, those in the art.

Figure 10A:
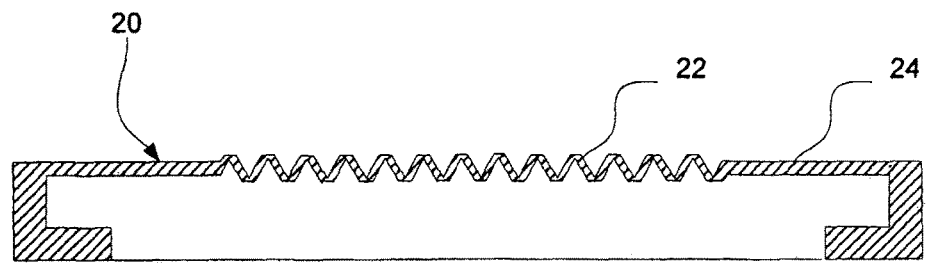
FIG. 10A illustrates a cross-sectional view of a further example of a lid including a membrane having a non-linear cross-sectional profile.
Figure 10B:
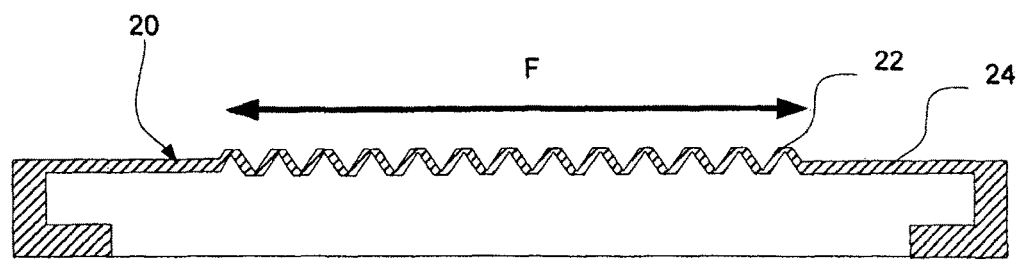
FIG. 10B illustrates a cross-sectional view the lid of FIG. 10A, wherein a force F has been applied to the lid to cause the non-linear cross-sectional profile of the membrane to expand.

In another optional form, at least a portion of the lid 10, in particular the membrane 20, can include a non-linear cross-sectional profile 22 as shown in FIG. 10A. The non-linear cross-sectional profile 22 can take the form of a plurality of fold lines forming a concertinaed arrangement as shown in FIG. 10A, an undulated, wave-like cross-sectional profile, or the like. The non-linear cross-sectional profile 22 of the membrane 20 allows for portions of the membrane 20 to expand more easily than linear cross-sectional portions 22 of the membrane 20, thereby reducing the amount of strain on the membrane whilst allowing the lid 10 to accommodate various sized storage units 200. This is clearly illustrated in FIG. 10B wherein the non-linear cross-sectional profile 22 of the membrane has expanded due to force F, however the portions of the membrane having a substantially linear cross-sectional profile 20 have remained substantially constant in length, thereby reducing the strain on the thin membrane 20. It will be appreciated that portions of the flange 40 can also include a non-linear profile such as a concertinaed or undulated arrangement.

Figure 10C:
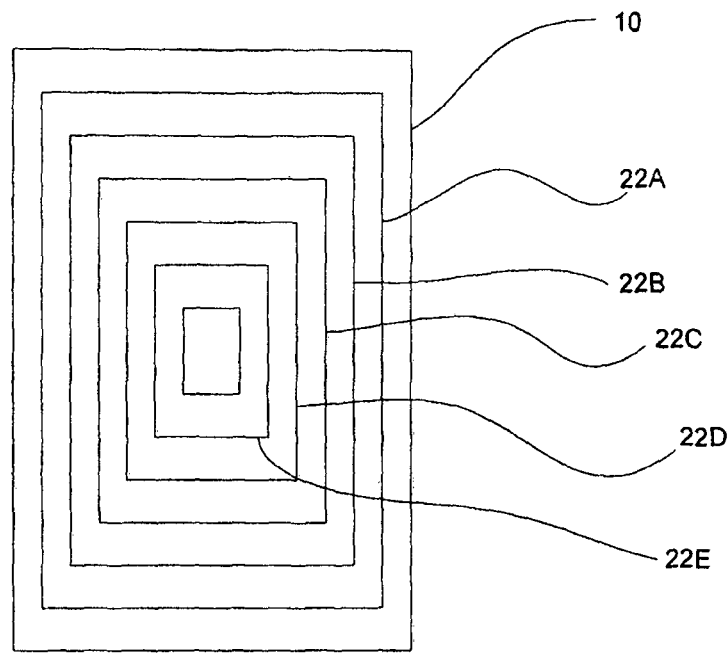
FIG. 10C illustrates a top view of an example of a lid having a number of fold lines in an unexpanded position.
Figure 10D:
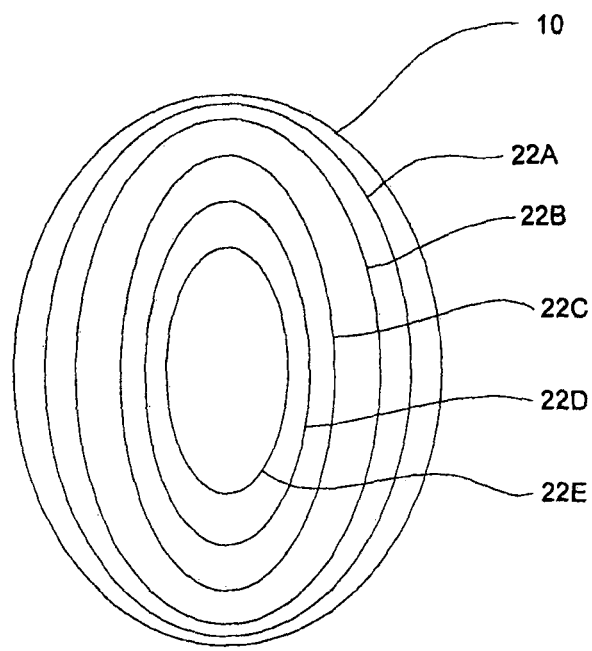
FIG. 10D illustrates a top view of the lid of FIG. 10C, wherein the lid has been stretched to engage about a differently shaped storage unit or rim thereof.

Referring to FIG. 10C there is shown a top view of the lid 10 having a non-linear cross-sectional profile including a plurality of fold lines 22A, 22B, 22C, 22D, 22E provided in the membrane 20 of the lid 10. As shown in FIG. 10C, the fold lines 22A, 22B, 22C, 22D, 22E are concentrically arranged. It will be appreciated that the concentrically arranged fold lines 22 may form various profiles such as circular, elliptical, or polygonal profiles such as rectangular profiles or the like. The lid 10 in FIG. 10C is shown in an unstretched state where no force has been applied to the lid. Referring to FIG. 10D, the lid 10 has been stretched to engage about a substantially circular or elliptical lip provided on the rim of a storage unit 200. As can be seen in FIG. 10D, the distance between neighbouring fold lines 22A, 22B, 22C, 22D, 22E has changed between the unstretched and stretched state enabling the lid to engage with the lip of a storage unit which has a perimeter profile which differs to the perimeter profile of the lid in the unstretched state shown in FIG. 10C. The non-linear profile of portions of the lid 10 thereby enables for differently shaped open faces of storage units 200 to be sealed with the same lid 10.

Figure 10E:
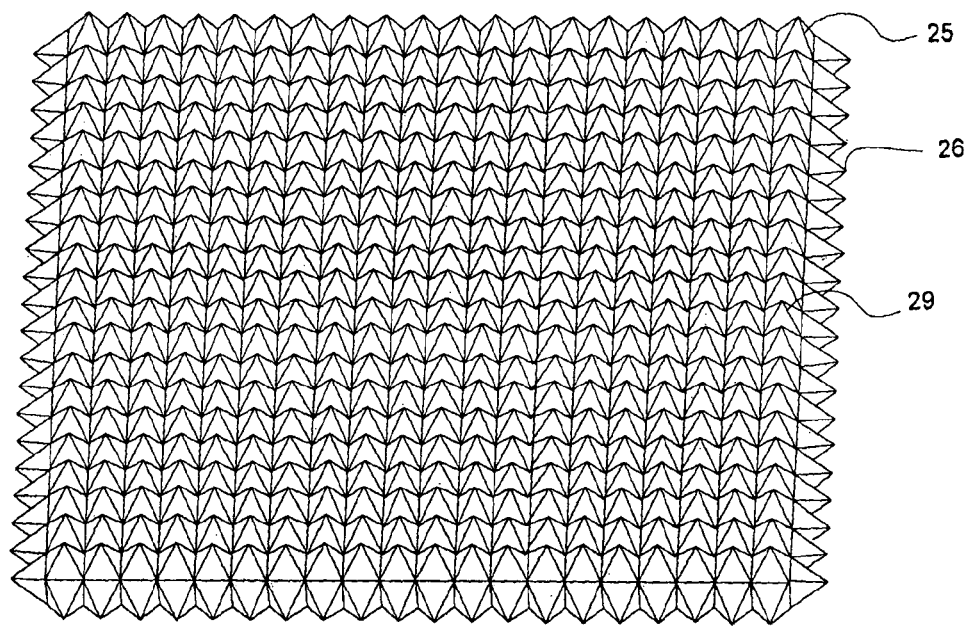
FIG. 10E illustrates a perspective view of an example of a lid including a membrane and flange having a non-linear cross-sectional profile.
Figure 10F:
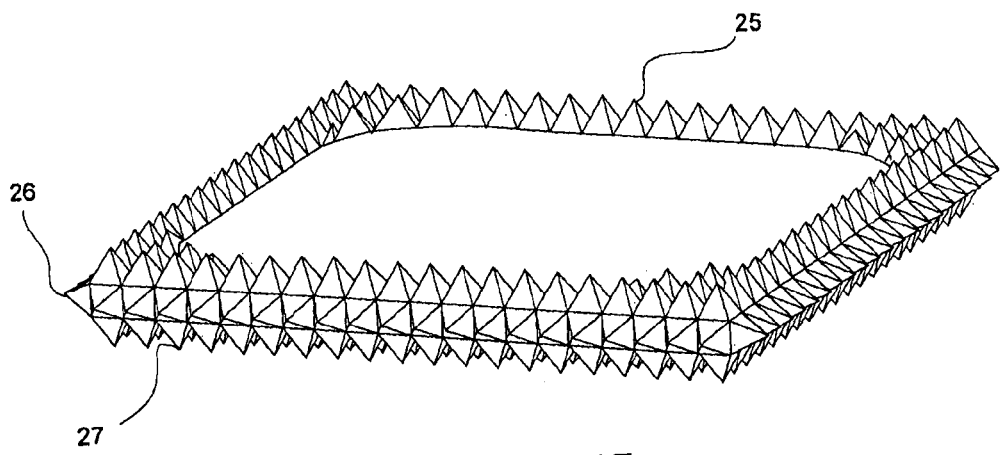
FIG. 10F illustrates a perspective view of an example of a lid including a portion of the membrane and the flange having a non-linear cross-section profile.

Referring to FIG. 10E there is shown another example of the lid 10 which includes a membrane having a non-linear cross-sectional profile. In particular, the non-linear cross-sectional profile is provided as a plurality of protrusions 29, specifically substantially pyramidic protrusions 29, which substantially form the membrane 20 of the lid 10, thereby allowing the membrane 20 to expand and distort according to differently shaped lips of storage units 200. More specifically, the each pyramidic protrusion 25 provided on a portion of the membrane 20 has an axis which extends orthogonally relative to the plane of the membrane 20 in the unstretched state. As also shown in FIG. 10E, the flange 40, including the first flange portion 45, includes a non-linear cross-sectional profile including a number of protrusions 26, such as pyramidic protrusions 26, wherein each pyramidic protrusion 26 provided on the first flange portion 45 includes an axis which extends substantially orthogonal to the axis of the pyramidic protrusions 25 provided on the membrane 20. As will be discussed in relation to FIG. 10F, a plurality of protrusions can be provided on the second flange portion 46. The plurality of protrusions 29 are configured to at least partially collapse and/or distort in one or more directions when a stretching force is applied to the lid 10 to thereby reduce the strain on the lid 10. Specifically, the apex of the pyramidic protrusions 29 is lowered thereby defining a more linear cross-sectional profile in a stretched state compared to the unstretched state. It will be appreciated that the protrusions 29 do not include a base surface. As shown in FIGS. 10E and 10F, base fold lines of the protrusions 29 can be shared between neighbouring protrusions 29. As shown, a in FIGS. 10E and 10F, a matrix layout of protrusions 29 can be provided on the lid 10. Additionally, it will be appreciated that, the membrane 20 can elastically stretch, expand and distort to seal an object in the storage unit 200 which protrudes above the rim of the storage unit 200.

Referring to FIG. 10F there is shown another example of the lid 10 which includes a portion of the membrane 20 including a non-linear cross-sectional profile, wherein pyramidic protrusions 25 are provided adjacent the perimeter of the membrane 20, however a portion of the membrane non-adjacent to the perimeter and flange 40 of the lid 10 does not include protrusions but rather includes a substantially linear cross-sectional profile. Additionally, pyramidic protrusions 26, 27 are also provided on the flange. In particular, a first set of pyramidic protrusions 26 are provided on the first flange 26 and a second set of pyramidic protrusions 27 are provided on the second flange portion 46. The first and second sets of pyramidic flange protrusions thereby allow the flange to expand and adjust to differently shaped lips provided on rims of storage units.

It will be appreciated that whilst pyramidic protrusions 25, 26, 27 have been shown by example for FIGS. 10C to 10F, wherein the pyramidic protrusions 25, 26, 27 collapse and distort according to various forces applied to the lid 10 when engaging the lip of the storage container 200, other shaped protrusions may also be used, as will be appreciated by those skilled in the art, to allow for the lid 10 to engage differently shaped rims, such that the lid 10 is a universal lid.

In an optional form the external edge of the flange includes one or more protruding members protruding therefrom to assist in applying leverage to the lid 10 when applying or removing the lid 10 to a storage unit 200. The plurality of protruding members can be located about the external perimeter 30 of the lid 10. The protruding members can be located at the corners 50 of the perimeter 30 in order to enable a user to easily apply leverage to the lid 10 when removing the lid 10 from a storage unit 200, and easily applying a stretching force to the lid 10 when applying the lid 10 to the storage unit 200.

Figure 11:
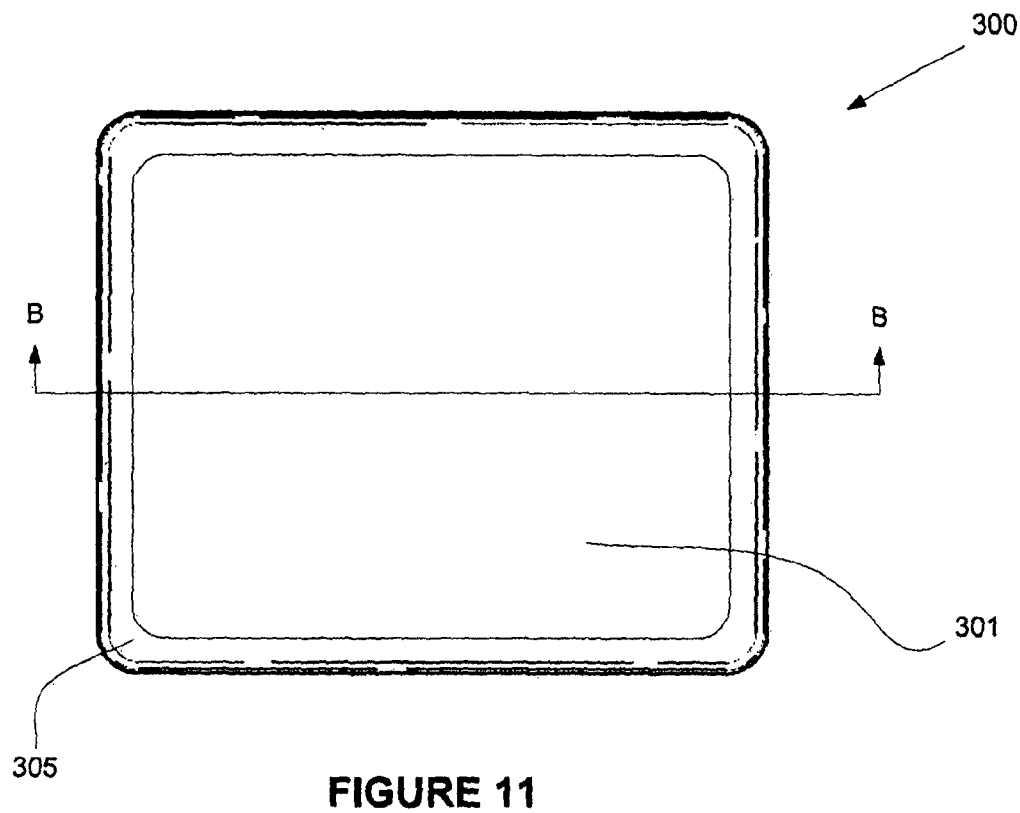
FIG. 11 illustrates a top view of an example of a band for sealing a storage unit.
Figure 12:
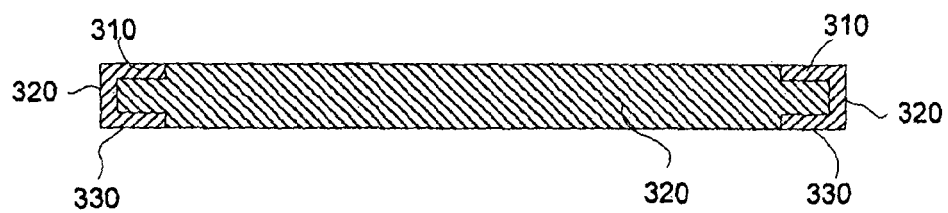
FIG. 12 illustrates a cross-sectional view of the band of FIG. 11 through section line B-B.
Figure 13:
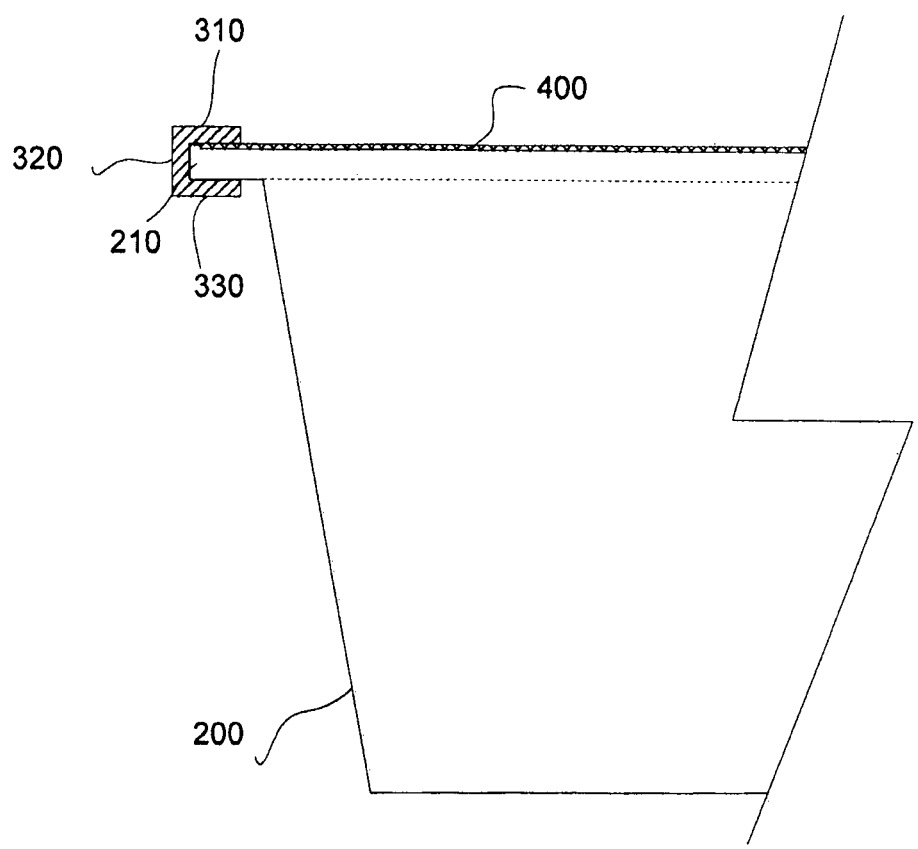
FIG. 13 illustrates a cross-sectional view of the band of FIG. 11 engaging a portion of a storage unit.

In another form, the structure may be provided in the form of a band 300, as illustrated by FIG. 11 to 13. In particular, the band is essentially a form of the lid 10 without the flexible membrane defining a central aperture 301. The band 300 includes a stretchable flange 305 for engaging about the lip of the storage unit. The band 300 is intended to be used in situations where a cover 400 may be placed over an open face of the storage unit 200, yet an air-tight seal is required. The band 300 may be placed around the lip of the storage unit 200 such that the cover is urged against the lip 210 of the storage unit 200. The cover may be a plate, a film or the like which has been discussed above which is used for closing an open face of a storage unit.

Referring more specifically to FIGS. 12 and 13, the band 300 includes a first flange portion 310, a second flange portion 320 and a third flange portion 330. The first flange portion 310 is elastically urged to seal against a top surface of the cover 400 and a top surface of the lip 210 of the storage unit 200. The second flange portion 320 extends from and is substantially orthogonal to the first flange portion 310. The third flange portion 330 extends from the second flange portion 320 and is substantially parallel relative to the first flange portion 310, wherein the third flange portion 330 is elastically urged to substantially seal against an underside of the lip 210 of the storage unit 200. In the event that the cover, such as film, extends over at least a portion of the rim of the storage unit 200, the second flange portion 320 and optionally the third flange portion 330 may elastically urge portions of the cover to substantially seal against a side and underside surface of the lip of the storage unit 200.

It will be appreciated that the band 300 may be used for storage units 200 such as food trays where a cover 400 is placed over the open face of the tray whilst resting on or placed over the rim. For these types of situations, the band is placed over and engages the lip 210 and the covering plate 400 such as to create a substantially air-tight seal which could not be achieved previously with the cover alone with the storage unit.

It will be appreciated that the flange, including the first, second and/or third flange portions 310, 320, 330 can include a non-linear cross-sectional profile. In particular, a plurality of protrusions can be provided in the surface of the flange to allow for expansion of the band to seal about various sized lips of the storage unit. In particular, the protrusions may be provided similarly to the pyramidic protrusions provided in FIGS. 10E and 10F as discussed for the lid 10. In additional or alternate forms, the non-linear cross-sectional profile of the flange portions can include concertinaed or undulated arrangements.

It, will be appreciated that many different forms of storage units may be engaged by the disclosed structure, including open faced containers, trays, bowls and vessels. It will also be appreciated that the perimeter of the structure can have various profiles, such as square/rectangular as shown in the figures, as well as other shapes such as a circular profile, an elliptical profile or any type of polygonal profile.

In the context of this specification, the word "comprising" means "including principally but not necessarily solely" or "having" or "including", and not "consisting only of". Variations of the word "comprising", such as "comprise" and "comprises" have correspondingly varied meanings.

Many modifications will be apparent to those skilled in the art without departing from the scope of the present invention.

The invention claimed is:

1. A lid for use with a container, the container having a plurality of interconnected edges exhibited by an outwardly extending lip defining a non-circular upper rim, said lid comprising:
    an elastic stretchable membrane adapted to overlay an open interior of the container;
    an elastic stretchable flange secured about a perimeter of said membrane, said flange having a plurality of sides matching the upper rim, said flange including, in cross section, first and second interconnected portions which, upon stretching said flange sides to lengths greater than the container rim edges, receive the extending container lip, releasing of said flange causing said flange and membrane to contract so that at least an inner surface of said first flange portion is adapted to bias against an outside of the lip edge of said container;
    a plurality of corners of said flange second portion exhibiting larger dimensions in comparison to non-corner portions, twisting rotation of said corners reversing said flange into an inside out non-use and washing configuration; and
    elastic stretch-ability of said lid permitting sealing engagement of container rims of equal or greater dimension.

2. The lid as described in claim 1, said flange portions each further comprising a cross sectional thickness greater than said membrane.

3. The lid as described in claim 1, said membrane further comprising an expandable non-linear cross sectional profile.

4. The lid as described in claim 1, said membrane further comprising a plurality of concentrically arrayed fold lines.

5. The lid as described in claim 3, said non-linear cross sectional profile further comprising an undulated wave-like profile.

6. The lid as described in claim 3, said non-linear cross sectional profile further comprising a plurality of pyramidic protrusions.

7. The lid as described in claim 6, further comprising additional pluralities of pyramidic protrusions incorporated into said flange.

8. The lid as described in claim 1, said membrane and flange each further comprising a silicone material.

9. A lid for substantially sealing a non-circular storage unit, the lid including:
    (i) an elastically stretchable flange cooperable with a lip provided on a rim of a non-circular storage unit, wherein the flange is elastically urged to seal against the lip of the storage unit, and
    (ii) an elastically stretchable membrane having a perimeter including the elastically stretchable flange, the elastically stretchable membrane configured to enclose an open face of the non-circular storage unit,
    the elastically stretchable flange comprising:
    a first flange portion extending from the membrane, and
    a second flange portion extending substantially orthogonal from the first flange portion, the second flange portion being larger at the corners of the lid compared to the non-corners of the lid so as to provide an overcentered arrangement at the lid corners,
    and wherein the first and second flange portions and the membrane are configured such that each of a portion of the membrane adjacent the flange, the first flange portion and the second flange portion cooperate to engage about the lip of the non-circular storage unit;
    and wherein the flange is twistable so as to be movable between
    (a) a lip engaging position in which the first flange portion extends downwardly from the membrane, and the second flange portion extends generally inwardly from the first flange portion, and
    (b) an out-turned position in which the first flange portion extends upwardly from the membrane, and the second flange portion extends outwardly from the first flange portion,
    and wherein the overcentered arrangement of the second flange portion at the lid corners retains the flange corners in the lip engaging position or the out-turned position.

10. The lid of claim 9, wherein the first and second flange portions have a cross-section thickness greater than a cross-section thickness of the membrane.

11. The lid of claim 10, wherein the lid is configured such that the membrane is depressible whilst a substantial portion of the flange is engaged about the lip of the storage unit such that excess air contained in the storage unit is expelled via a lifted portion of the flange when the membrane is depressed.

12. A lid for use with a container, the container having a plurality of interconnected edges exhibited by an outwardly extending lip defining a non-circular upper rim, said lid comprising:
    an elastic stretchable membrane adapted to overlay an open interior of the container, said membrane further including an expandable non-linear cross sectional profile, said non-linear cross sectional profile further including a plurality of pyramidic protrusions, additional pluralities of pyramidic protrusions incorporated into said flange;
    an elastic stretchable flange secured about a perimeter of said membrane, said flange having a plurality of sides matching the upper rim, said flange including, in cross section, first and second interconnected portions which, upon stretching said flange sides to lengths greater than the container rim edges, receive the extending container lip, releasing of said flange causing said flange and membrane to contract so that at least an inner surface of said first flange portion is adapted to bias against an outside of the lip edge of said container; and
    elastic stretch-ability of said lid permitting sealing engagement of container rims of equal or greater dimension.

* * * * *